United States Patent
Nakamura

(10) Patent No.: US 10,591,695 B2
(45) Date of Patent: Mar. 17, 2020

(54) OPTICAL DEVICE

(71) Applicant: NIKON VISION CO., LTD., Tokyo (JP)

(72) Inventor: Masahiro Nakamura, Yokohama (JP)

(73) Assignee: NIKON VISION CO., LTD., Tokyo (JP)

(*) Notice: Subject to any disclaimer, the term of this patent is extended or adjusted under 35 U.S.C. 154(b) by 643 days.

(21) Appl. No.: 14/954,015

(22) Filed: Nov. 30, 2015

(65) Prior Publication Data

US 2016/0103294 A1 Apr. 14, 2016

Related U.S. Application Data

(63) Continuation of application No. PCT/JP2014/002858, filed on May 29, 2014.

(30) Foreign Application Priority Data

May 30, 2013 (JP) ................. 2013-113693

(51) Int. Cl.
*G02B 7/02* (2006.01)
*G02B 15/14* (2006.01)
(Continued)

(52) U.S. Cl.
CPC ............... *G02B 7/004* (2013.01); *G02B 7/04* (2013.01); *G02B 23/16* (2013.01); *G02B 25/001* (2013.01); *G03B 17/565* (2013.01)

(58) Field of Classification Search
CPC ...... G03B 17/14; G11B 7/0932; G02B 7/021; G02B 7/102; G02B 7/10; G02B 25/002; G02B 7/04
(Continued)

(56) References Cited

U.S. PATENT DOCUMENTS 5,532,883 A 7/1996 Fukino
5,719,712 A * 2/1998 Ishikawa ................. G02B 7/04
359/819
(Continued)

FOREIGN PATENT DOCUMENTS

JP 8-5894 1/1996
JP 2001-242389 9/2001
(Continued)

OTHER PUBLICATIONS

International Search Report dated Sep. 2, 2014, in corresponding International Application No. PCT/JP2014/002858.

*Primary Examiner* — Dawayne Pinkney

(57) ABSTRACT

Provided is an optical device including an object-side body portion to and from which an eyepiece-side support member supporting an eyepiece system optical component can be attached and removed; an objective system optical component supported on the object-side body portion; a housing section that houses at least a portion of the eyepiece-side support member; a manipulation member by which a rotation manipulation is performed on the housing section; a following member that is driven and displaced by the manipulation member being rotated; and a gripping member that has at least a portion thereof arranged inside the housing section and grips the eyepiece-side support member when the following member is displaced. The manipulation member rotates freely relative to the following member when a gripping force exerted on the eyepiece-side support member by the gripping member reaches a prescribed value.

17 Claims, 12 Drawing Sheets

(51) Int. Cl.
*G02B 7/00* (2006.01)
*G02B 7/04* (2006.01)
*G02B 23/16* (2006.01)
*G02B 25/00* (2006.01)
*G03B 17/56* (2006.01)

(58) Field of Classification Search
USPC .................. 359/811–830, 694–704, 808
See application file for complete search history.

(56) References Cited

U.S. PATENT DOCUMENTS

| | | |
|---|---|---|
| 6,515,806 B2 | 2/2003 | Denpo |
| 8,861,094 B2 | 10/2014 | Iwasa |
| 2006/0200941 A1* | 9/2006 | Kim .................. H04M 1/0216 16/221 |
| 2013/0057965 A1* | 3/2013 | Iwasa .................. G03B 3/00 359/704 |

FOREIGN PATENT DOCUMENTS

| | | |
|---|---|---|
| JP | 2001-281518 | 10/2001 |
| JP | 2003-107570 | 4/2003 |
| JP | 2006-126586 | 5/2006 |
| JP | 2007-72077 | 3/2007 |
| JP | 2013-57762 | 3/2013 |

\* cited by examiner

OPTICAL DEVICE

The contents of the following Japanese patent applications are incorporated herein by reference:
NO. 2013-113693 filed on May 30, 2013 and
PCT/JP2014/002858 filed on May 29, 2014.

BACKGROUND

1. Technical Field

The present invention relates to an optical device.

2. Related Art

In an optical device including an attachable and detachable eyepiece, there is a structure that prevents the eyepiece from falling off by contacting a screw that is screwed in the radial direction, as shown in Patent Document 1, for example.

Patent Document 1: Japanese Patent Application Publication No. 2006-126586

Since the structure contacting the screw is provided to contact the screw from one side of the optical axis, there are cases where the optical axis of the eyepiece is shifted from the optical axis of the overall optical device.

SUMMARY

According to a first aspect of the present invention, provided is an optical device comprising an object-side body portion to and from which an eyepiece-side support member supporting an eyepiece system optical component can be attached and removed; an objective system optical component supported on the object-side body portion; a housing section that houses at least a portion of the eyepiece-side support member; a manipulation member by which a rotation manipulation is performed on the housing section; a following member that is driven and displaced by the manipulation member being rotated; and a gripping member that has at least a portion thereof arranged inside the housing section and grips the eyepiece-side support member when the following member is displaced. The manipulation member rotates freely relative to the following member when a gripping force exerted on the eyepiece-side support member by the gripping member reaches a prescribed value.

According to a second aspect of the present invention, provided is an optical device comprising an eyepiece-side support member to and from which an object-side body portion supporting an objective system optical component can be attached and removed; an eyepiece system optical component supported on the eyepiece-side support member; an insertion portion that has at least a portion thereof inserted into a housing section provided in the object-side body portion; a manipulation member by which a rotation manipulation is performed on the eyepiece-side support member; a following member that is driven and displaced by the manipulation member being rotated; and an expanding member that has at least a portion thereof arranged outside of the insertion portion and presses on an inner surface of the housing section when the following member is displaced. The manipulation member rotates freely relative to the following member when a pressing force exerted on the housing section by the expanding member reaches a prescribed value.

According to a third aspect of the present invention, provided is an optical device described above, in which the objective system optical component and the eyepiece system optical component form the optical system of a telescope when the eyepiece-side support member is attached to the object-side body portion.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
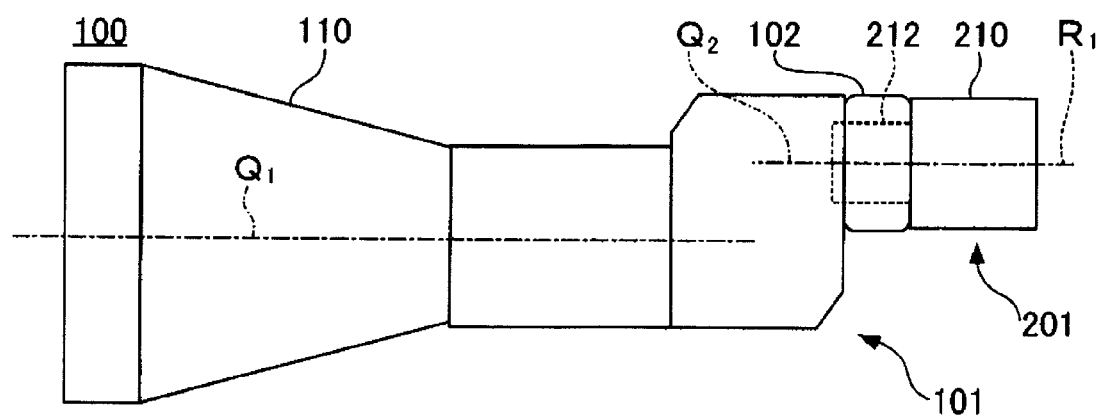
FIG. 1 is a schematic view of the entirety of a telescope 100.

FIG. 1 is a schematic view of a telescope 100. The telescope 100 is formed by combining an objective section 101 and an eyepiece section 201, which can be separated from each other. In the following description, the objective section 101 side is referred to as the "front side" and the side where the eyepiece section 201 is arranged is referred to as the "back side."

In the telescope 100, the insertion portion 212, which is a portion of the eyepiece section 201, is inserted into the holding section 102 provided on the back end of the objective section 101. The inner surface of the holding section 102 has a shape that is substantially complementary to the circumferential surface of the insertion portion 212. As a result, in a state where the optical axis $R_1$ of the eyepiece section 201 substantially matches the optical axis $Q_2$ at the back side of the objective section 101, the insertion portion 212 can be inserted to and removed from the holding section 102 in a direction parallel to the optical axis $Q_2$.

Furthermore, by performing a manipulation described further below, the insertion portion 212 is gripped without displacing the optical axis $R_1$ of the eyepiece section 201 and is held in a manner to prevent falling from the objective section 101 of the eyepiece section 201. In this way, the optical system of the telescope 100 is formed by combining the objective system optical component 120 and the eyepiece system optical component 220.

Figure 2:
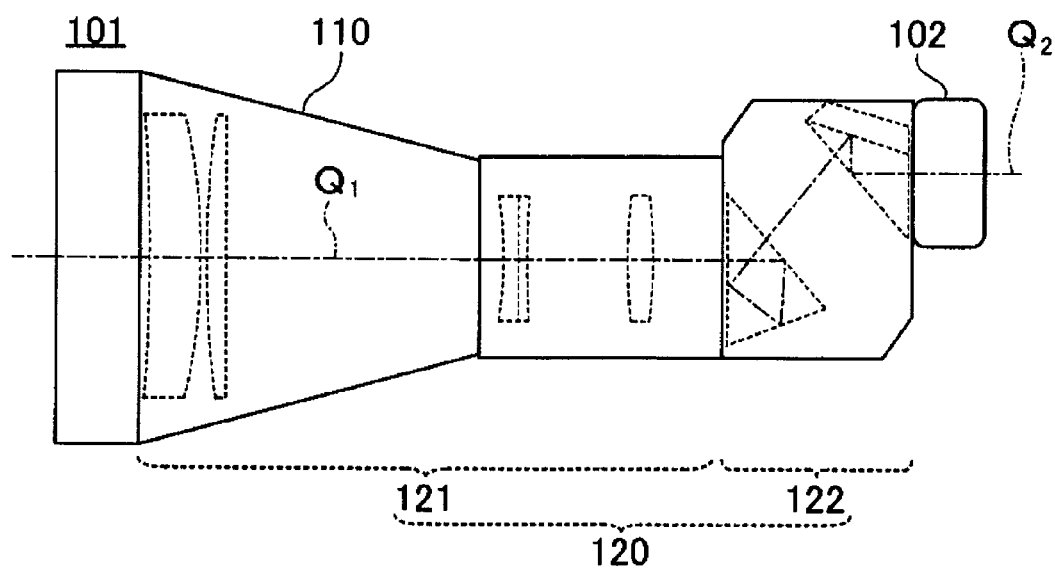
FIG. 2 is a schematic view of the structure of the objective section 101.

FIG. 2 is a schematic view of the objective section 101. The objective section 101 includes an object-side barrel 110, an objective system optical component 120, and the holding section 102.

The object-side barrel 110 has an overall cylindrical shape, and houses and supports the objective system optical component 120 therein. The objective system optical component 120 includes an objective lens group 121 and an erecting system optical component 122 that are arranged sequentially inside the object-side barrel 110. The holding section 102 is arranged on the side of the erecting system optical component 122 that is opposite the objective lens group 121 in the objective section 101.

The objective lens group 121 includes a plurality of optical lenses arranged along a common optical axis $Q_1$, and forms an optical image of a subject facing the objective lens group 121. The erecting system optical component 122 forms an erect image by inverting the optical image formed by the objective lens group 121. With an erecting system optical component 122 using a roof prism or the like, the propagation optical axis of the light beam forming the optical image moves. Accordingly, there are cases where the optical axis $Q_2$ at the emission end of the erecting system optical component 122 differs from the optical axis $Q_1$ of the objective lens group 121.

Figure 3:
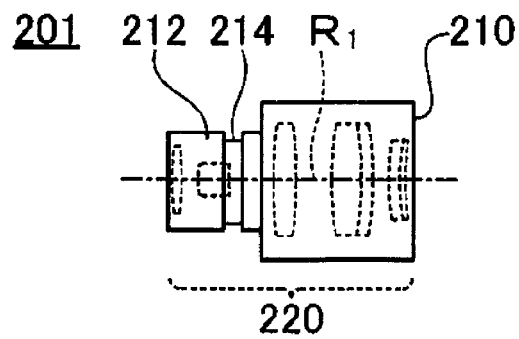
FIG. 3 is a schematic view of the structure of the eyepiece section 201.

FIG. 3 is a schematic view of the structure of the eyepiece section 201. The eyepiece section 201 includes an eyepiece-side barrel 210 and an eyepiece system optical component 220.

The eyepiece-side barrel 210 has a substantially cylindrical shape, and houses and supports the eyepiece system optical component 220 therein. The eyepiece system optical component 220 includes a plurality of lenses arranged sequentially along a single optical axis $R_1$ inside the eyepiece-side barrel 210.

In the eyepiece section 201, a portion of the eyepiece-side barrel 210 forms an insertion portion 212 that has a smaller diameter than other portions of the eyepiece-side barrel 210. The insertion portion 212 also has a substantially cylindrical outer shape. Furthermore, a portion of the insertion portion 212 includes a circumferential groove 214 that has an even smaller diameter and forms a pair of steps.

When the eyepiece section 201 is attached to the holding section 102 of the objective section 101, the user of the telescope 100 can observe the erect image of the subject formed by the objective system optical component 120 in a state having been enlarged by the eyepiece system optical component 220. Furthermore, the magnification rate of the image observed by the user can be changed by replacing the eyepiece section 201.

Figure 4:
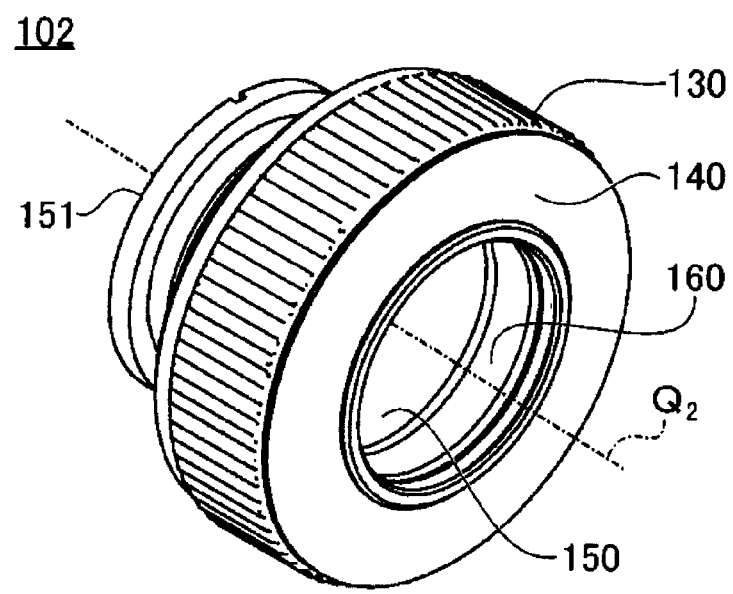
FIG. 4 is a perspective view of the holding section 102.

FIG. 4 is a perspective view independently showing the outer appearance of the holding section 102. The holding section 102 includes a rotating body that is formed around the optical axis $Q_2$, and also includes a pillar-shaped through-hole formed around the optical axis $Q_2$ that allows the light beam of the optical image formed by the objective system optical component 120 to pass therethrough. The holding section 102 includes a manipulation ring 130, a following member 140, a holding cylinder 150, and a gripping member 160.

The manipulation ring 130 has the relatively largest diameter. When the user performs a rotation manipulation, the manipulation ring 130 rotates relative to the holding cylinder 150 with the optical axis $Q_2$ as the rotational axis. Since the manipulation ring 130 is manipulated by the user, a slide stopper such as a rubber ring is provided on the outer circumferential surface. Instead of a slide stopping member, a slide stopping shape may be provided by performing knurling or the like.

The following member 140 is rotatable relative to the holding cylinder 150, with the optical axis $Q_2$ as the rotational axis. When the manipulation ring 130 is rotated, there are cases where the following member 140 rotates together with the manipulation ring 130 and cases where the following member 140 does not rotate with the manipulation ring 130. These cases are described further below with reference to other drawings.

The holding cylinder 150 has an internal surface with a shape substantially complementary to the outer circumferential surface of the insertion portion 212 in the eyepiece section 201, and forms a housing section that houses the insertion portion 212 inserted therein. It should be noted that the inner diameter of the holding cylinder 150 is sufficient to allow the insertion portion 212 to be smoothly inserted and removed.

A screw ring 151 can be attached on the left end of the holding cylinder 150 shown in this drawing. When the holding section 102 is attached to the object-side barrel 110, the screw ring 151 attaches to the holding cylinder 150 from the inside of the object-side barrel 110, thereby preventing the holding section 102 from falling off of the object-side barrel 110.

In a state where the insertion portion 212 is inserted into the holding cylinder 150, the gripping member 160 protrudes to the inside of the holding cylinder 150, thereby holding the insertion portion 212 and preventing the eyepiece section 201 from falling. The gripping member 160 holds or releases the insertion portion 212 according to the user performing the rotation manipulation on the manipulation ring 130.

Figure 5:
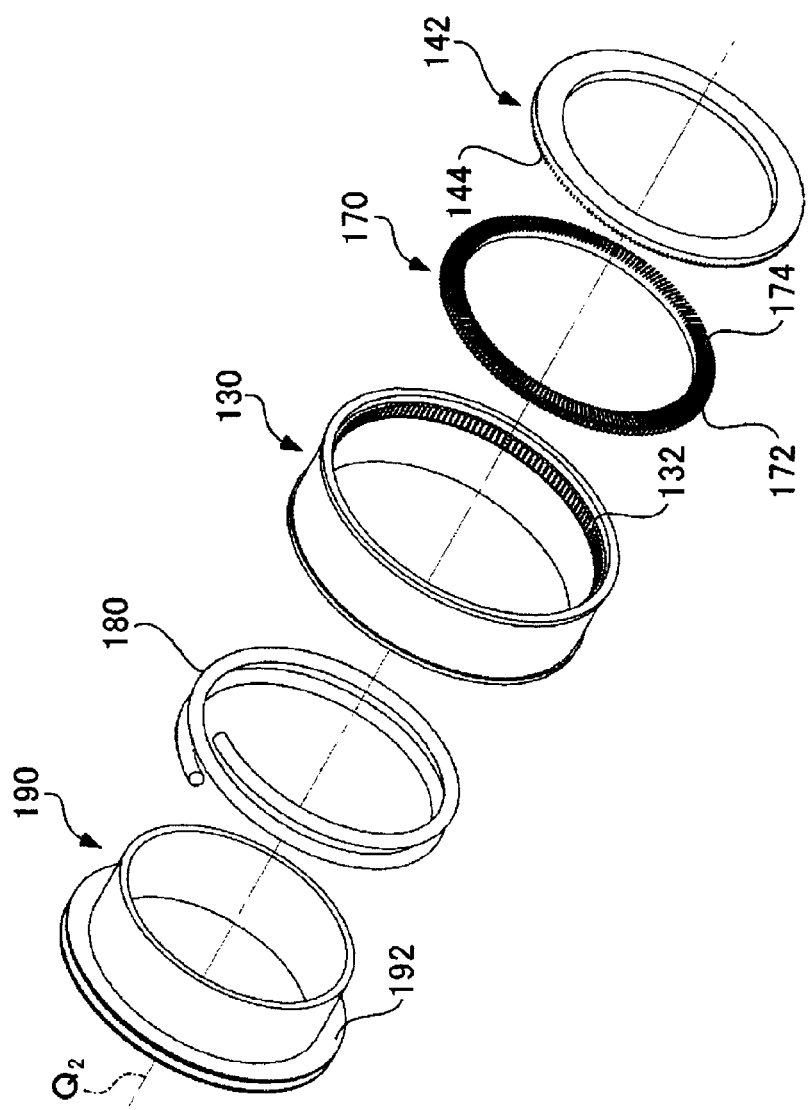
FIG. 5 is an exploded perspective view of a portion of the holding section 102.

FIG. 5 is an exploded perspective view of a portion of the holding section 102. FIG. 5 shows the transferring portion 142, a sliding member 170, the manipulation ring 130, a bias member, and a following cylinder 190, in the stated order. Here, the slide stopping rubber ring is removed from the manipulation ring 130. Furthermore, a ring gear 132 is formed on the inner surface of the manipulation ring 130 by a plurality of teeth in a straight line parallel to the optical axis $Q_2$.

The transferring portion 142 is a portion of the following member 140, and corresponds to the back side of the end surface of the following member 140 shown in FIG. 4. Accordingly, the transferring portion 142 rotates on the optical axis $Q_2$ relative to the holding cylinder 150 integrally with the following member 140. The transferring portion 142 includes following teeth 144 formed radially relative to the optical axis $Q_2$ on the surface facing the sliding member 170 adjacent thereto.

The sliding member 170 is shaped as a ring with a diameter substantially equal to the diameter of the transferring portion 142, and includes driving teeth 174 that interlock with the following teeth 144 of the transferring portion 142 and are formed on the surface facing the transferring portion 142. The sliding member 170 includes sliding teeth 172 that interlock with the ring gear 132 of the manipulation ring 130 and are formed on the outer circumferential surface. The thickness of the sliding member 170 may be less than the tooth width of the ring gear 132 of the manipulation ring 130.

The bias member 180 is shaped as a coil spring and deforms elastically in a direction parallel to the optical axis $Q_2$. When the holding section 102 is assembled, the bias member 180 causes one end to contact a flange 192 formed on one end of the following cylinder 190.

The following cylinder 190 is coupled to the following member 140 to be formed integrally with the following member 140. Accordingly, when the holding section 102 is assembled, the bias member 180 is sandwiched between the sliding member 170 and the following cylinder 190, and the sliding member 170 is biased in a direction pressing against the transferring portion 142.

As shown in FIG. 5, each member forming the holding section 102 has an open space around the optical axis $Q_2$. As a result, the holding section 102 has an overall cylindrical shape with a through-hole that penetrates therethrough along the optical axis $Q_2$. Accordingly, the holding section 102 allows light to pass from the objective system optical component 120 to the eyepiece system optical component 220.

Figure 6:
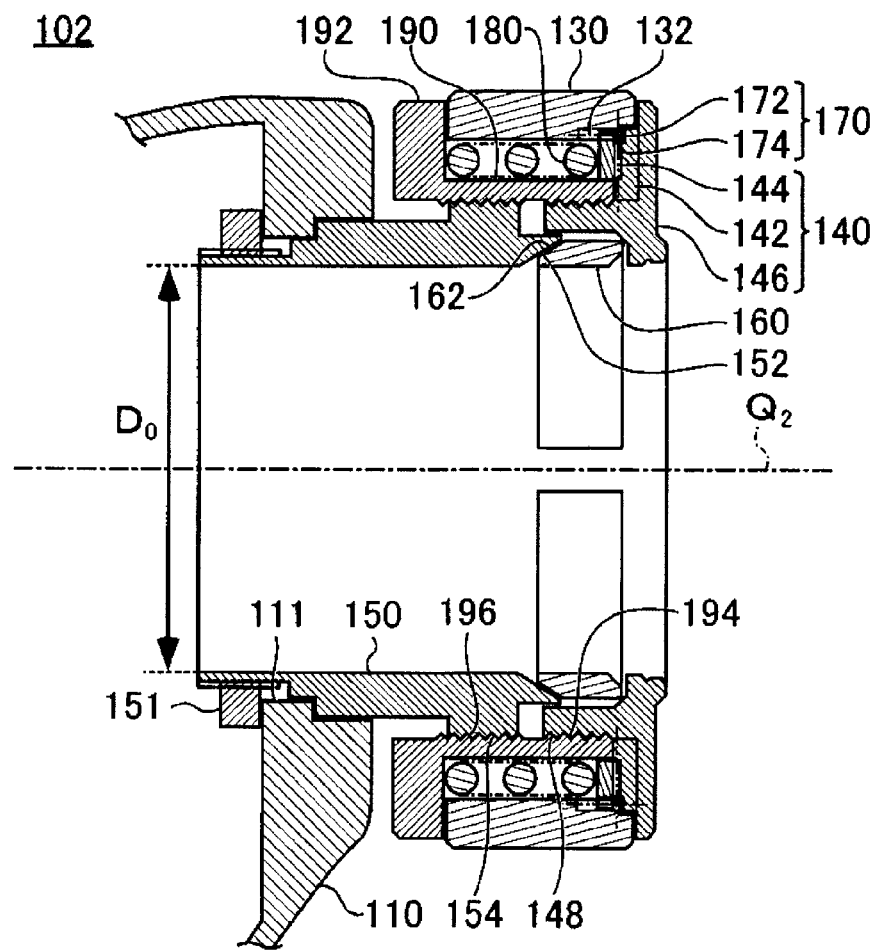
FIG. 6 is a cross-sectional view of the holding section 102.

FIG. 6 is a cross-sectional view of the holding section 102 attached to the object-side barrel 110 in the assembled state. Components that are the same as components shown in FIGS. 1 to 5 are given the same reference numerals, and redundant descriptions are omitted.

The holding section 102 is attached to the object-side barrel 110 by inserting one end of the holding cylinder 150 through the attachment hole 111 provided on the end surface of the object-side barrel 110. As a result, a portion of the object-side barrel 110 is sandwiched by the end surface of the holding cylinder 150 and the screw ring 151, and therefore the holding section 102 is secured to the object-side barrel 110.

In the holding section 102, a pair of screw threads 194 and 196 are formed in the inner surface of the following cylinder 190 at a distance from each other. A screw thread 148 formed on the following member 140 is screwed together with the one screw thread 194 positioned on the right side in the drawing. A portion of the screwed-in following member 140 contacts the end surface of the following cylinder 190, and presses against the following cylinder 190 in a direction parallel to the optical axis $Q_2$. Accordingly, once screwed in, the screw thread 148 of the following member 140 does not easily come loose from the following cylinder 190, such that the following cylinder 190 and following member 140 are formed integrally.

In the following cylinder 190, the other screw thread 196 that is on the left side in the drawing screws together with a screw thread 154 formed on the outer circumferential surface of the holding cylinder 150. In this case, the holding cylinder 150 and the following cylinder 190 remain out of contact with each other at all portions other than the screw threads 154 and 196. Accordingly, the following cylinder 190 can rotate relative to the holding cylinder 150 while being screwed together with the holding cylinder 150. It should be noted that, when the following cylinder 190 rotates, the screw threads 154 and 196 cause the following cylinder 190 to be displaced in a direction parallel to the optical axis $Q_2$ relative to the holding cylinder 150.

One set including the screw threads 196 and 154 may be a right screw and the other set including the screw threads 194 and 148 may be a left screw. In this way, when the following member 140 rotates, the following member 140 can be prevented from coming loose from the following cylinder 190.

The following member 140 screwed to the following cylinder 190 has a pressing portion 146 formed integrally with the transferring portion 142. The pressing portion 146 has a portion that protrudes toward the inside, in a direction approaching the optical axis $Q_2$. Therefore, the end of the pressing portion 146 closer to the optical axis $Q_2$ has a portion facing the end of the gripping member 160 in a direction parallel to the optical axis $Q_2$. In other words, the pressing portion 146 prevents the ring-shaped gripping member 160 from falling from the inside of the holding cylinder 150 in a direction toward the optical axis $Q_2$.

The gripping member 160 is sandwiched between an inclined surface 152 formed on an end surface of the holding cylinder 150 and the pressing portion 146 of the following member 140 in a direction parallel to the optical axis $Q_2$, in an internal plane of the holding section 102. A portion of the gripping member 160 facing the inclined surface 152 of the holding cylinder 150 forms an inclined surface 162 that is complementary to the inclined surface 152. As a result, at least a portion of the gripping member 160 enters inside the holding cylinder 150 in the radial direction.

When the following cylinder 190 is rotated relative to the holding cylinder 150, the following member 140 is displaced in a direction parallel to the optical axis $Q_2$ relative to the holding cylinder 150. When the following member 140 is displaced in a direction that causes the space between the inclined surface 152 of the holding cylinder 150 and the pressing portion 146 of the following member 140 to become narrower, the gripping member 160 is pressed toward the inside of the holding cylinder 150. As a result, the internal diameter of the gripping member 160 becomes smaller.

The gripping member 160 has a notched portion 164 in a portion thereof in the circumferential direction. Accordingly, the internal diameter of the gripping member 160 can be decreased without bending inside the holding section 102.

In the state shown in the drawing, the internal diameter of the gripping member 160 is greater than the internal diameter $D_0$ of the holding cylinder 150. Accordingly, when the insertion portion 212 of the eyepiece section 201 is inserted into the inside of the holding cylinder 150, the gripping member 160 does not interfere with the insertion of the insertion portion 212.

The assembled body formed by the following member 140 and the following cylinder 190 being joined to each other in an integrated manner houses a portion of the manipulation ring 130, the sliding member 170, and the bias member 180. Specifically, a portion on the internal circumferential side of the manipulation ring 130 is positioned between the following member 140 and the flange 192 of the following cylinder 190. As a result, the manipulation ring 130 can rotate relative to the following cylinder 190 and the following member 140, but does not fall away from the following cylinder 190 and the following member 140.

The bias member 180 and the sliding member 170 are sandwiched between the following member 140 and the flange 192 of the following cylinder 190. The sliding member is arranged at a position adjacent to the following member 140. Accordingly, the sliding member 170 is biased toward the following member 140 by the bias member 180, and is arranged inside the ring gear 132 of the manipulation ring 130.

Figure 7:
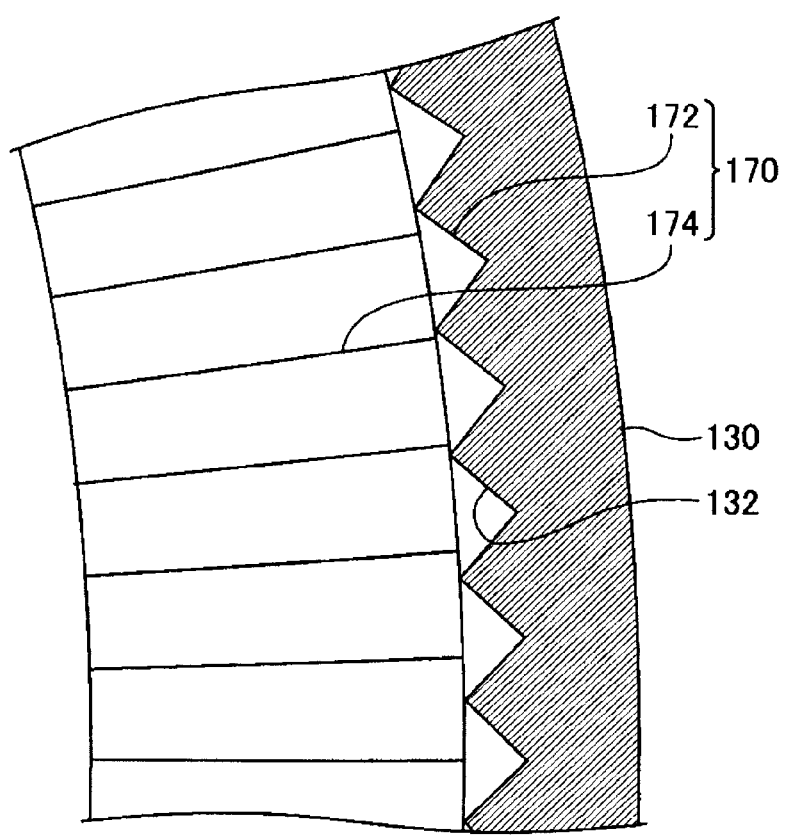
FIG. 7 shows a state in which the manipulation ring 130 and the sliding member 170 are interlocked.

FIG. 7 shows an enlarged portion of the manipulation ring 130 and the sliding member 170 in the holding section 102 shown in FIG. 6, as seen from a direction parallel to the optical axis $Q_2$. In the sliding member 170 arranged inside the manipulation ring 130, the sliding teeth 172 formed on the outer circumferential surface interlock with the ring gear 132 on the inner circumference of the manipulation ring 130. Accordingly, when the manipulation ring 130 rotates on the optical axis $Q_2$, the sliding member 170 always rotates together with the manipulation ring 130 on the optical axis $Q_2$.

As described above, the thickness of the sliding member 170 is less than the tooth width in a direction of the optical axis $Q_2$ of the ring gear 132. Accordingly, the sliding member 170 slides freely relative to the manipulation ring 130 in a direction parallel to the optical axis $Q_2$, within a range of the tooth width of the ring gear 132. The sliding teeth 172 of the sliding member 170 and the ring gear 132 of the manipulation ring 130 can have lower teeth heights by including a greater number of teeth, and it is therefore possible to prevent an increase in the dimensions of the sliding member 170 without decreasing the transmitted drive torque.

Figure 8:
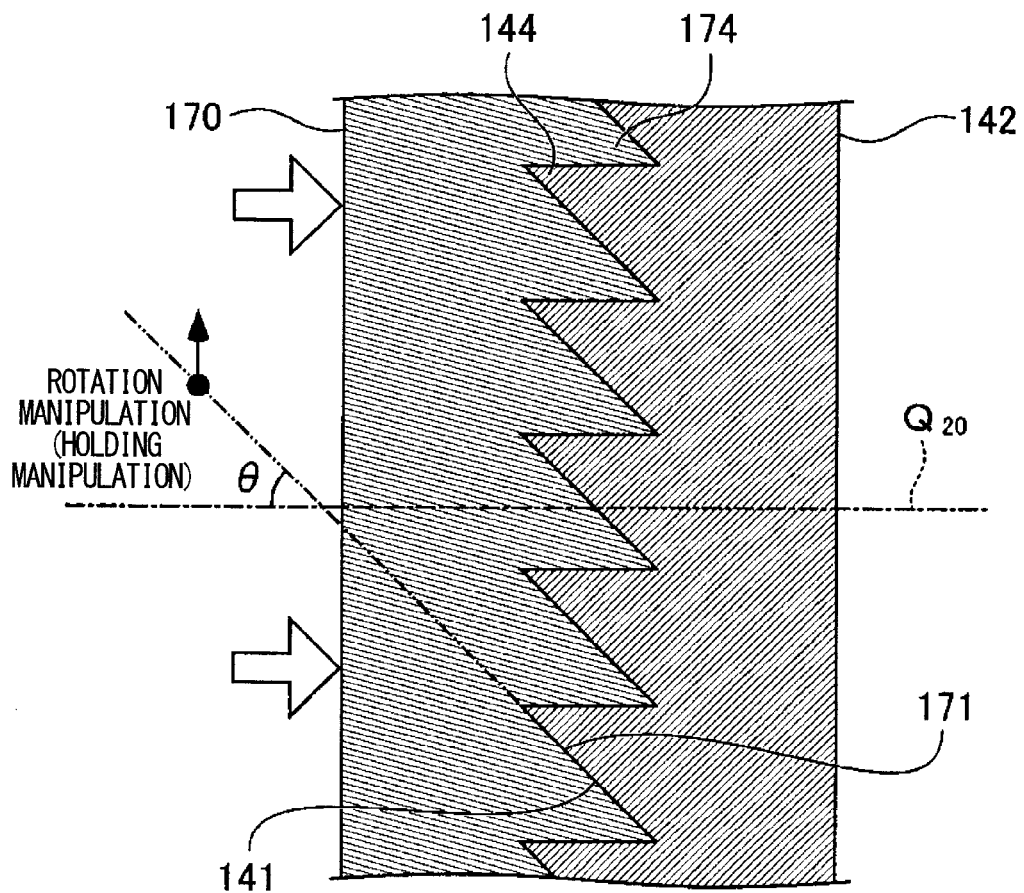
FIG. 8 is a cross-sectional view of the sliding member 170 and the transferring portion 142.

FIG. 8 is a cross-sectional view of a state in which the driving teeth 174 of the sliding member 170 are interlocked with the following teeth 144 of the transferring portion 142 in the holding section 102 shown in FIG. 6. This cross section is obtained by expanding the cylindrical cross section including a circular plane orthogonal to each of the driving teeth 174 and the following teeth 144 into a flat plane. The dashed line $Q_{20}$ in the drawing indicates the line of intersection between the cross section shown in the drawing and the flat plane including the optical axis $Q_2$.

As shown by the white arrows in the drawing, the bias member 180 presses the sliding member 170 toward the transferring portion 142 of the following member 140. As a result, the following teeth 144 of the transferring portion 142 and the driving teeth 174 of the sliding member 170 interlock with each other.

When the insertion portion 212 of the eyepiece section 201 inserted into the holding section 102 is held, manipulation is performed to rotate the manipulation ring 130 clockwise as seen from the back end of the holding section 102, thereby rotating the manipulation ring 130 relative to the object-side barrel 110. When the manipulation ring 130 is manipulated to rotate clockwise, the sliding member 170 rotates clockwise together with the manipulation ring 130. Accordingly, the transferring portion 142 that is interlocked with the sliding member 170 also rotates together with the sliding member 170. In this way, when the driving teeth 174 and the following teeth 144 are interlocked, the following member 140 can be rotated by performing the rotation manipulation on the manipulation ring 130.

The sliding member 170 rotating clockwise is displaced upward in the view shown in this cross section. Accordingly, the driving teeth 174 has a large inclination θ relative to the straight line $Q_{20}$, and the rotational movement is transferred from the interlock surface 171 to the interlock surface 141 of the following teeth 144. The following teeth 144 of the transferring portion 142 and the driving teeth 174 of the sliding member 170 can have lower teeth heights by including a greater number of teeth, and it is therefore possible to prevent an increase in the dimensions of the sliding member 170 without decreasing the transmitted drive torque.

Figure 9:
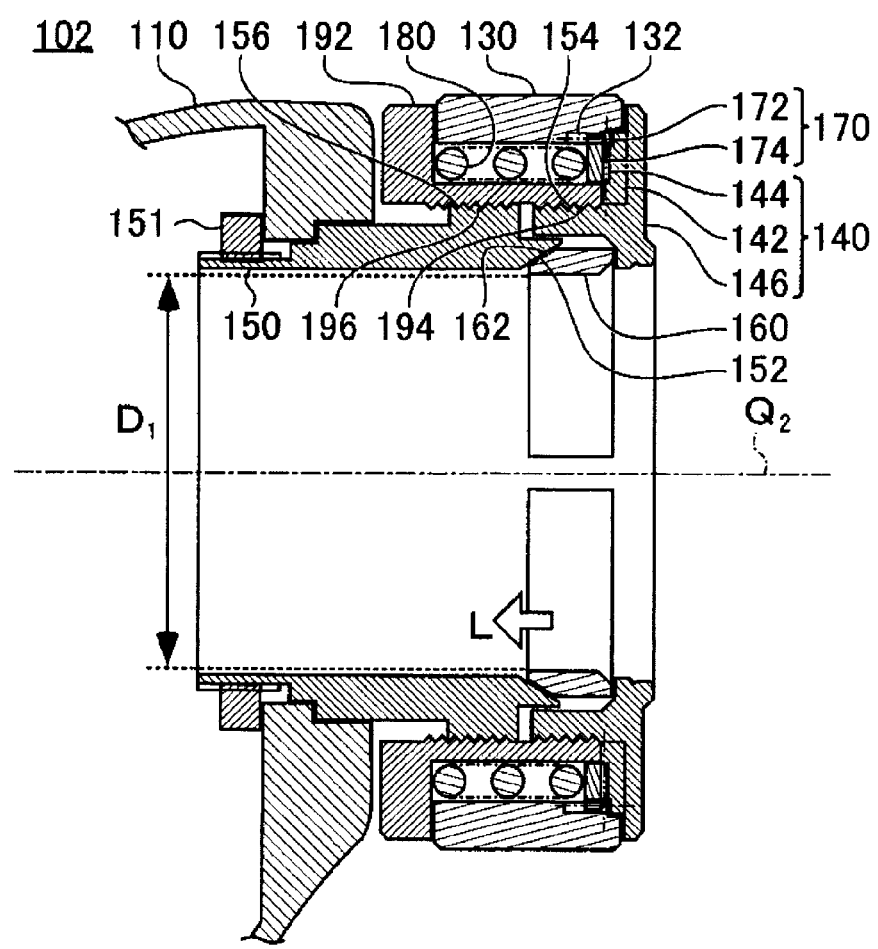
FIG. 9 is a cross-sectional view of the holding section 102.

FIG. 9 is a cross-sectional view of the holding section 102 in a state after the manipulation ring 130 has been rotated clockwise. When the rotation manipulation is performed on the manipulation ring 130, the rotation of the manipulation ring 130 is transferred to the following member 140 through the sliding member 170 interlocking with both the manipulation ring 130 and the following member 140. As a result, the following cylinder 190 formed integrally with the following member 140 rotates and is displaced toward the left in the drawing along the screw thread 154 of the holding cylinder 150.

As a result, the pressing portion 146 of the following member 140 displaces the gripping member 160 toward the left in the drawing, as shown by the white arrow L in the drawing. Accordingly, the inclined surface 162 of the gripping member 160 presses against the inclined surface 152 of the holding cylinder 150. The inclined surfaces 152 and 162 are inclined in a manner to make the inner diameter smaller when farther to the left in the drawing, and therefore the gripping member 160 displaced to the left in the drawing has a reduced inner diameter. As a result, the inner diameter $D_1$ of the gripping member 160 is less than the inner diameter of the holding cylinder 150.

The relationship between the inclination δ of the inclined surfaces 152 and 162 relative to the optical axis $Q_2$, the displacement amount M of the gripping member 160, and the change amount Δd of the inner diameter of the gripping member 160 is shown below in Expression 1.

$$\Delta d = 2 \times M \times \tan \delta \qquad \text{Expression 1}$$

Accordingly, assuming that the variation in the outer diameter of the insertion portion 212 is approximately 0.1 mm, for example, in order to ensure a change amount Δd of 0.01 mm from the inclined surfaces 152 and 162 having an inclination δ of 30°, when the pitch of the screw threads 154 and 196 is 1 mm, the following member 140 should be rotated by approximately 36°.

When the insertion portion 212 of the eyepiece section 201 is inserted into the holding cylinder 150, the insertion portion 212 is gripped by the gripping member 160 through the movement of the holding section 102 such as described above. Furthermore, when the rotation manipulation of the manipulation ring 130 uses a greater rotation amount, the displacement amount of the gripping member 160 becomes greater. As a result, the gripping strength with which the gripping member 160 grips the insertion portion 212 becomes greater.

When the inner diameter of the gripping member 160 is small, substantially all of the inner circumferential surface becomes equally close to the optical axis $Q_2$. Accordingly, deviation of the optical axis $R_1$ of the eyepiece section 201 is prevented by the insertion portion 212 being gripped by the gripping member 160.

When the circumferential groove 214 is provided in the insertion portion 212 inserted into the holding section 102, the gripping member 160 preferably grips the region that includes the steps formed by the circumferential groove 214. In this way, the insertion portion 212 can be held more reliably and the eyepiece section 201 can be prevented from falling.

If the gripping member 160 falls into the circumferential groove 214, the gripping member 160 might be hit by the insertion portion 212 during insertion or removal. Accordingly, a portion of the gripping member 160 is preferably arranged at a position differing from the circumferential groove 214.

Figure 10:
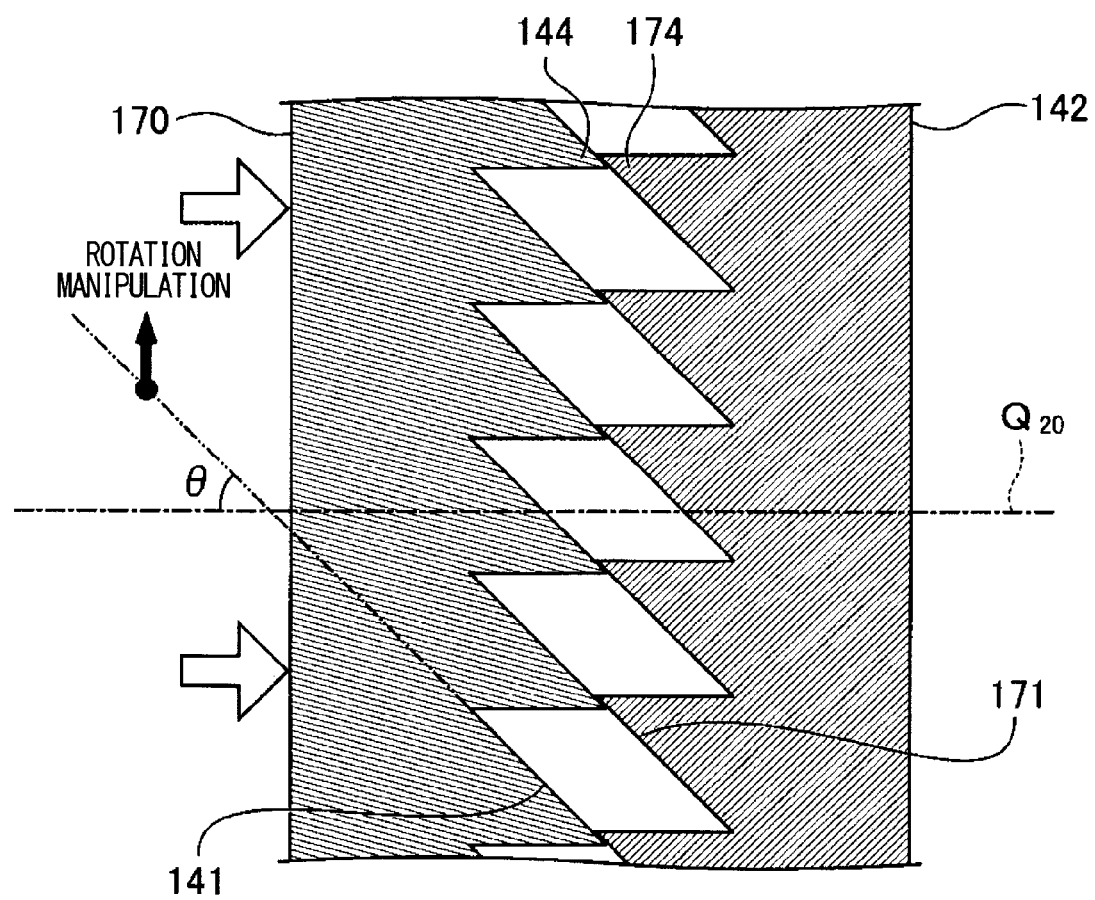
FIG. 10 is a cross-sectional view of the sliding member 170 and the transferring portion 142.

FIG. 10 is a cross-sectional view showing a state of the holding section 102 shown in FIG. 9 resulting from a stronger rotation manipulation in the clockwise direction being performed on the manipulation ring 130. FIG. 10 shows the holding section 102 from the same viewpoint as in FIG. 8.

When a clockwise rotation manipulation is performed on the manipulation ring 130, the rotation is transferred through fastening interlock surfaces 141 and 171 that are inclined significantly relative to the straight line $Q_{20}$ between the driving teeth 174 of the sliding member 170 and the following teeth 144 of the transferring portion 142. Therefore, when the rotational load on the following member 140 is increased by the gripping member 160 strongly gripping the insertion portion 212, the force that is generated by the interlock surfaces 141 and 171 and causes the sliding member 170 to move away from the transferring portion 142 gradually increases.

When the force pulling away the sliding member 170 exceeds the bias force of the bias member 180, at least a portion of the sliding member 170 moves away from the following member 140 including the transferring portion 142, and finally one of the driving teeth 174 and the following teeth 144 passes by the other, as shown in the drawing. In this way, the rotation of the manipulation ring 130 caused by the rotation manipulation is not transferred to the following member 140, and therefore the following member 140 does not rotate and the manipulation ring 130 rotates freely relative to the following member 140.

In this way, the sliding member 170 is pressed against the transferring portion 142 by the bias member 180, and transfers the rotation of the manipulation ring 130 caused by the rotation manipulation to the following member 140. Furthermore, even when the gripping member 160 having a reduced inner diameter holds the insertion portion 212 of the eyepiece section 201 and it is difficult for the following member 140 to be displaced, the rotation is transferred from the sliding member 170 to the following member 140 until the gripping force of the gripping member 160 on the insertion portion 212 reaches a prescribed value.

However, when the gripping force of the gripping member 160 on the insertion portion 212 reaches the prescribed value, a portion of the driving teeth 174 moves away from the following teeth 144 against the bias force of the bias member 180, and when one of the driving teeth 174 and the following teeth 144 finally passes by the other, the manipulation ring 130 rotates freely relative to the following member 140.

As a result, the gripping force of the gripping member 160 on the insertion portion 212 can be restricted from becoming excessive. When the manipulation ring 130 is rotating freely, a sound is generated each time the driving teeth 174 pass by the following teeth 144, and therefore the user can be made aware that the gripping member 160 is already gripping the insertion portion 212 with a strong enough gripping force.

The prescribed value (threshold value) at which the manipulation ring 130 begins to rotate freely can be adjusted according to the amount of the bias force applied to the sliding member 170 by the bias member 180, for example. The threshold value is also affected by friction caused by surface finishing and the materials of the following member 140 and the sliding member 170. Furthermore, the inclination θ of the interlock surfaces 141 and 171 relative to the straight line $Q_{20}$ can also affect the threshold value. Accordingly, the threshold value for the gripping force of the holding section 102 can be adjusted in consideration of all of these characteristics.

In other words, the threshold value may be set by calculating the spring constant of the bias member 180, the friction coefficient, the inclination θ, and the like in advance, or may be set by selecting the material of each component such as the following member 140 and the sliding member 170. The threshold value may be adjusted by applying a lubricant or anti-slipping agent, for example.

In this way, when the insertion portion 212 of the eyepiece section 201 is inserted, the holding section 102 can grip the insertion portion 212 and prevent the eyepiece section 201 from falling as a result of a clockwise rotation manipulation performed on the manipulation ring 130. Furthermore, when the insertion portion 212 is being held, the gripping member 160 holds substantially the entire circumference of the insertion portion 212, and therefore the optical axis R1 of the eyepiece section 201 is prevented from deviating from the center of the holding section 102.

By performing a strong rotation manipulation on the manipulation ring 130, the gripping force of the gripping member 160 on the insertion portion 212 can be increased within a range extending up to a predetermined threshold value. However, when the gripping force of the gripping member 160 exceeds the threshold value, the manipulation ring 130 rotates freely, thereby preventing an excessive gripping force from occurring. In this way, the strain on both the user and the device is reduced, the following member 140, the gripping member 160, and the like are firmly attached, and it is possible to prevent the release of the hold on the eyepiece section 201 by the holding section 102 from becoming difficult.

Figure 11:
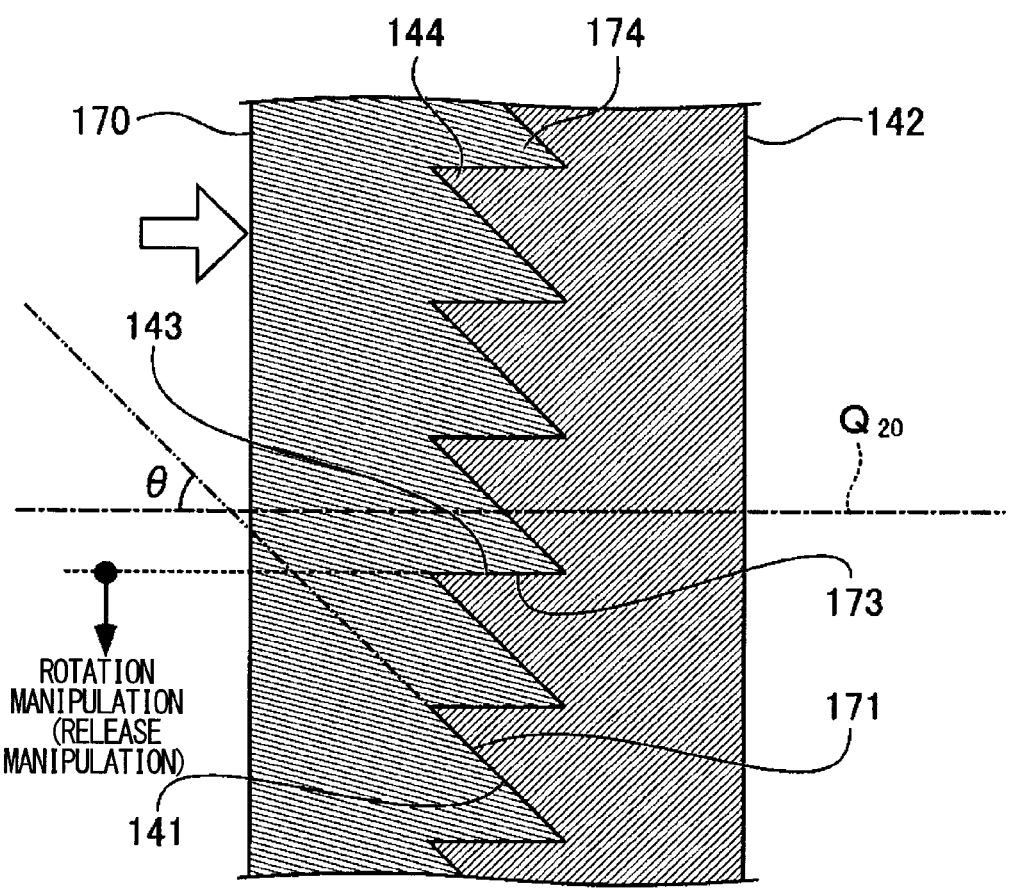
FIG. 11 is a cross-sectional view of the sliding member 170 and the transferring portion 142.

FIG. 11 is a cross-sectional view of the sliding member 170 and the transferring portion 142 in the holding section 102 shown in FIG. 9, in a state where the eyepiece section 201 has released its hold on the insertion portion 212, i.e. a state where a counter-clockwise rotation manipulation has been performed on the manipulation ring 130. FIG. 11 shows the holding section 102 from the same viewpoint as in FIGS. 8 and 10.

When the rotation manipulation is not being performed on the manipulation ring 130, the sliding member 170 that is biased by the bias member 180 presses firmly against the transferring portion 142. As a result, the following teeth 144 of the transferring portion 142 and the driving teeth 174 of the sliding member 170 are interlocked with each other. From this state, when the rotation manipulation is performed to rotate the manipulation ring 130 counter-clockwise as seen from the back end side of the holding section 102, the sliding member 170 rotates counter-clockwise along with the manipulation ring 130, and the transferring portion 142 that is interlocked with the sliding member 170 also rotates.

Here, the sliding member 170 rotating counter-clockwise is displaced downward in the cross-sectional drawing. Accordingly, the driving teeth 174 transfer the rotation to the interlock surface 143 of the following teeth 144, through the interlock surface 173 that has almost no inclination relative to the straight line $Q_{20}$.

In this way, even when the manipulation force and manipulation amount used to manipulate the manipulation ring 130 are small, the sliding member 170 moves away from the transferring portion 142 and the manipulation ring 130 does not rotate freely relative to the following member 140. In this way, when releasing the hold of the holding section 102 on the insertion portion 212, the eyepiece section 201 can be reliably released without the manipulation ring 130 rotating freely.

The structure of the optical device such as described above can be applied to a wide variety of optical devices having a structure in which optical elements are connected to each other or isolated from each other, in addition to the telescope 100. Examples of such optical devices include microscopes, binoculars, and cameras.

As described above, the rotation transfer structure in which the manipulation ring 130 rotates freely when the holding force on the insertion portion 212 exceeds a threshold value and the manipulation ring 130 does not rotate freely when releasing the hold on the insertion portion 212 can also be formed by components that are displaced in the radial direction of the manipulation ring 130. However, by using a sliding member 170 that slides parallel to the optical axis $Q_2$, an increase in the overall diameter of the holding section 102 can be restricted and the ease of manipulating the holding section can be improved.

In the above examples, a holding section 102 is provided to an object-side barrel 110 in a telescope 100 to which an eyepiece section 201 can be attached and removed. However, a holding mechanism corresponding to the holding section 102 may be provided to the eyepiece section 201.

When a holding mechanism is provided in the eyepiece section 201, as an example, the structure should be such that, in a state where the eyepiece section 201 is inserted in a depression provided in the object-side barrel 110, when the rotation manipulation is performed on the manipulation ring 130 provided on the eyepiece section 201 side, the diameter of the insertion portion 212 increases. In this case, when the gripping force received by the insertion portion 212 from the object-side barrel 110 exceeds the threshold value, excessive gripping can be prevented by having the manipulation ring 130 rotate freely.

Figure 12:
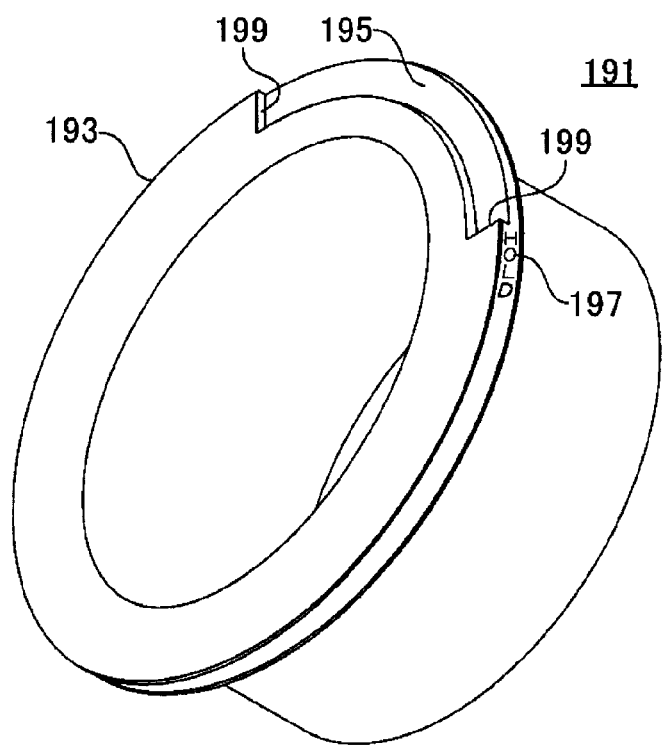
FIG. 12 is a perspective view of another following cylinder 191.

FIG. 12 is a perspective view of a following cylinder 191 according to another embodiment. The following cylinder 191 has a different shape than the following cylinder 190 by including an escape groove 195 that is depressed relative to the end surface in the outer circumference of the flange 193. The escape groove 195 is formed as a portion of the outer circumference of the flange 193, and therefore a pair of side walls 199 are formed by the steps in the circumferential end portion of the escape groove 195.

The following cylinder 191 has a rotation mark 197 near the circumferential end portion of the escape groove 195. The rotation mark 197 is arranged in the outer circumferential surface of the flange 193, and can be seen from the outside even when attached to the holding section 102.

Figure 13:
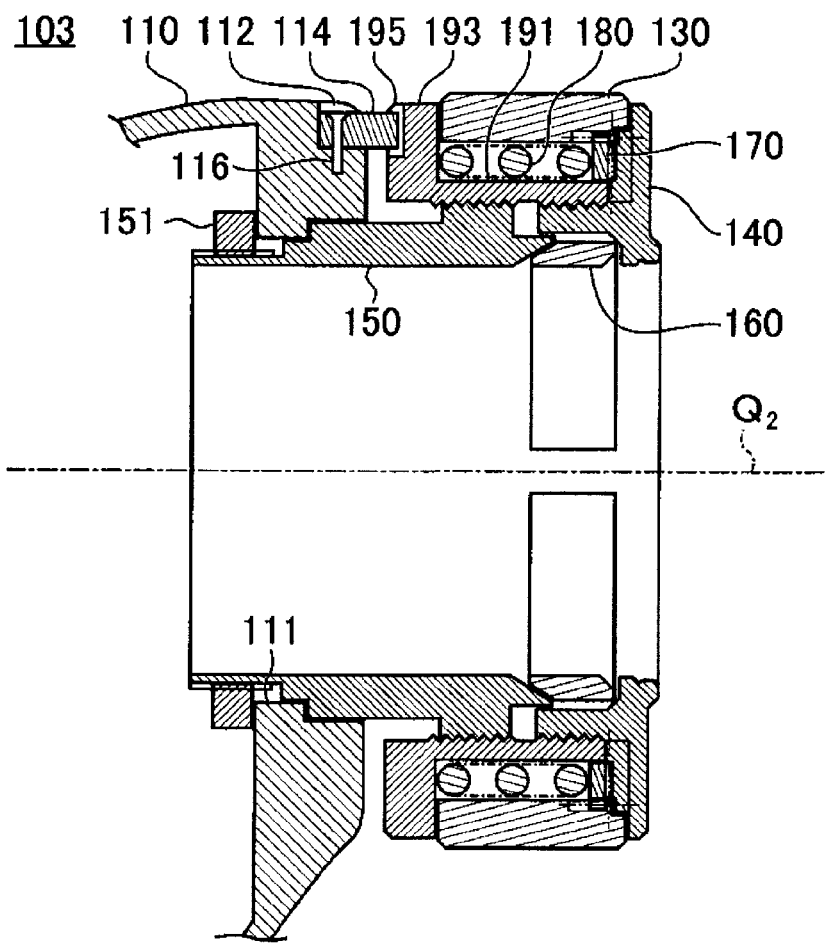
FIG. 13 is a cross-sectional view of another holding section 103.

FIG. 13 is a cross-sectional view of another holding section 103 including the following cylinder 191 described above. FIG. 13 uses the same viewpoint as in FIGS. 6 and 9. Aside from the structure described below, the holding section 103 has the same structure as the holding section 102. Accordingly, identical components are given the same reference numerals and redundant descriptions are omitted.

The holding section 103 differs from the holding section 102 by including the following cylinder 191 described above and also by including a regulating member 114. The regulating member 114 has a rectangular outer shape and has one end thereof secured to the interlocking portion 112 provided on the object-side barrel 110. The regulating member 114 is secured by a stopping screw 116, and can be removed from the object-side barrel 110.

When the regulating member 114 is attached to the holding section 103 including the following cylinder 191, the other end of the regulating member 114 is inserted inside the escape groove 195 formed in the flange 193. Accordingly, the following member 140 including the following cylinder 191 rotates together with the manipulation ring 130 on which the rotation manipulation is performed, and when the regulating member 114 contacts either side wall 199 of the escape groove 195, the rotation of the following member 140 is stopped. In this state, when the manipulation ring 130 is rotated further, the manipulation ring 130 rotates freely relative to the following member 140.

In this way, the holding section 103 includes a regulating section that regulates the rotation amount of the following member 140 relative to the holding cylinder 150. As a result, excessive rotation manipulation of the manipulation ring 130 is prevented. Furthermore, when the manipulation ring 130 is rotated excessively to the release side, the following cylinder 191 can be prevented from falling off of the holding cylinder 150.

The regulating member 114 described above has a mark that forms a pair with a rotation mark 197 provided on the flange 193 of the following cylinder 191. Specifically, when the rotation of the following member 140 causes a side wall 199 of the escape groove 195 to contact the regulating member 114, the rotation mark 197 is adjacent to the regulating member 114. As a result, it is possible for the rotation mark 197 to indicate whether the following member 140 is being rotated in a direction to hold the insertion portion 212 or in a direction to release the insertion portion 212.

The regulating member 114 can be arranged at a position that cannot be seen from the outside, by providing regulating member 114 in a manner to protrude from the inside to the outside of the holding cylinder 150. With this configuration, the rotation mark 197 can be formed by printing on the front surfaces of the following cylinder 190 and the object-side barrel 110.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

100: telescope, 101: objective section, 102, 103: holding section, 110: object-side barrel, 112: interlocking portion, 111: attachment hole, 114: regulating member, 116: stopping screw, 120: objective system optical component, 121: objective lens group, 122: erecting system optical component, 130: manipulation ring, 132: ring gear, 140: transferring portion, 141, 143, 171, 173: interlock surface, 142: transferring portion, 144: following teeth, 146: pressing portion, 148, 154, 194, 196: screw thread, 150: holding cylinder, 151: screw ring, 152, 162: inclined surface, 160: gripping member, 164: notched portion, 170: sliding member, 172 sliding teeth, 174: driving teeth, 180: bias member, 190, 191: following cylinder, 192, 193: flange, 195: escape groove, 197: rotation mark, 199: side wall, 201: eyepiece section, 210: eyepiece-side barrel, 212: insertion portion, 214: circumferential groove, 220: eyepiece system optical component

What is claimed is:
1. An optical device, comprising:
an object-side body portion to and from which an eyepiece-side support member supporting an eyepiece system optical component can be attached and removed;

an objective system optical component supported on the object-side body portion;
a housing section that houses at least a portion of the eyepiece-side support member;
a manipulation member by which a rotation manipulation is performed on the housing section;
a sliding member that engages the manipulation member and that rotates with the rotation manipulation by the manipulation member;
a following member that contacts the manipulation member at a surface substantially perpendicular to a rotational axis of the manipulation member and that is driven and displaced by a rotation of the sliding member; and
a gripping member that has at least a portion thereof arranged inside the housing section and grips the eyepiece-side support member when the following member is displaced,
wherein
interlocking sections are provided on a surface of the sliding member and a surface of the following member, the surfaces of the sliding member and the following member contacting each other, and
the interlocking sections of the sliding member and the following member disengage from each other to move the sliding member in a direction parallel to the rotational axis, such that the manipulation member rotates freely relative to the following member when the gripping force exerted on the eyepiece-side support member by the gripping member reaches a prescribed value.

2. The optical device according to claim 1, wherein
the manipulation member displaces the following member as a result of the rotation manipulation and increases the gripping force with which the eyepiece-side support member is gripped.

3. The optical device according to claim 1, wherein
when the rotation of the manipulation member is performed in a second rotation direction that is opposite to the first rotation direction, the manipulation member drives the following member without rotating freely relative to the following member.

4. The optical device according to claim 1, wherein
the manipulation member includes:
 a manipulation ring that rotates according to the rotation manipulation;
 the sliding member that is joined to the manipulation ring, rotates together with the manipulation ring, and slides relative to the manipulation ring in a direction parallel to the rotational axis of the manipulation ring; and
 a bias member that biases the sliding member in a direction parallel to the rotational axis,
when the sliding member is pressed by the bias member, rotation of the manipulation ring is transferred to the following member and the following member rotates relative to the object-side body portion, and
when the sliding member moves away from the following member against the bias force of the bias member to disengage an interlock between the interlocking sections, the following member does not rotate regardless of rotation of the manipulation ring.

5. The optical device according to claim 4, wherein
the sliding member and the following member include:
 grip contact surfaces that are inclined relative to the rotational axis and transfer rotation by contacting each other when the manipulation ring is rotated in a direction for increasing the gripping force of the gripping member, and
 release contact surfaces that are inclined relative to the rotational axis by an amount that is less than the inclination of the grip contact surfaces, and transfer rotation by contacting each other when the manipulation ring is rotated in a direction for decreasing the gripping force of the gripping member.

6. The optical device according to claim 1, further comprising:
a regulating section that regulates a rotational range of the following member relative to the eyepiece-side support member to be within a predetermined range.

7. The optical device according to claim 1, further comprising:
a rotation position mark that indicates a rotation position of the following member when the gripping member grips the eyepiece-side support member and a rotation position of the following member when the gripping member has released the grip on the eyepiece-side support member.

8. The optical device according to claim 4, wherein
the manipulation ring, the sliding member, the bias member, the following member, and the gripping member are provided between the objective system optical component and the eyepiece system optical component.

9. The optical device according to claim 1, wherein
when the gripping member has released the grip on the eyepiece-side support member, the eyepiece-side support member is movable in a direction parallel to an optical axis of the eyepiece system optical component relative to the object-side body portion.

10. The optical device according to claim 1, wherein
the housing section is provided with a male thread on a portion of an outer circumference thereof,
the following member is provided with a female thread on a portion of an inner circumference thereof, the female thread to be screwed with the male thread, and
the following member is displaced relative to the housing section along a direction parallel to the rotational axis due to the rotation manipulation of the manipulation member.

11. The optical device according to claim 4, wherein
the interlocking section of the manipulation member is provided on the sliding member, and
the sliding member slides in the direction parallel to the rotational axis when the gripping force exerted on the eyepiece-side support member by the gripping member reaches the prescribed value to disengage the interlock between the interlocking sections.

12. The optical device according to claim 4, wherein
driving teeth are provided at the interlocking section of the sliding member, and
following teeth are provided at the interlocking section of the following member.

13. The optical device according to claim 12, wherein
a sound is generated due to the driving teeth and the following teeth coming into contact, when the interlock between the interlocking sections is disengaged and the driving teeth of the sliding member pass by the following teeth of the following member.

14. The optical device according to claim 1, wherein
a ring gear is formed along the rotational axis in each of the manipulation member and the sliding member, and
the manipulation member and the sliding member engage with each other via the ring gears.

15. The optical device according to claim 1, wherein
the housing section has male threads formed on an outer circumferential surface thereof,
the following member has female threads formed on an inner circumferential surface thereof, the female threads interlocking with the male threads of the housing section, and
the following member is displaced, while rotating about the rotational axis with the rotation manipulation of the manipulation member, relative to the housing section in a direction parallel to the rotational axis.

16. The optical device according to claim 15, wherein
a concave portion having side walls is formed on a part of a surface of the following member, the surface being perpendicular to the rotational axis,
a convex portion is formed on the housing section or a member to be linked to the housing section, the convex portion being inserted in the concave portion, and
the rotation of the following member about the rotational axis is regulated when the following member rotates in at least one direction about the rotational axis to make the convex portion contact at least one of the side walls of the concave portion.

17. An optical device comprising:
an eyepiece-side support member to and from which an object-side body portion supporting an objective system optical component can be attached and removed;
an eyepiece system optical component supported on the eyepiece-side support member;
an insertion portion that has at least a portion thereof inserted into a housing section provided in the object-side body portion;
a manipulation member by which a rotation manipulation is performed on the eyepiece-side support member;
a sliding member that engages the manipulation member and that rotates with the rotation manipulation by the manipulation member;
a following member that contacts the manipulation member at a surface substantially perpendicular to a rotational axis of the manipulation member and that is driven and displaced by a rotation of the sliding member; and
an expanding member that has at least a portion thereof arranged outside of the insertion portion and presses on an inner surface of the housing section when the following member is displaced,
wherein
interlocking sections are provided on a surface of the sliding member and a surface of the following member, the surfaces of the sliding member and the following member contacting each other, and
the interlocking sections of the sliding member and the following member disengage from each other to move the sliding member in a direction parallel to the rotational axis, such that the manipulation member rotates freely relative to the following member when the pressing force exerted on the housing section by the expanding member reaches a prescribed value.

* * * * *